United States Patent [19]

Ohhashi

[11] Patent Number: 4,672,984

[45] Date of Patent: Jun. 16, 1987

[54] ULTRASONIC WAVE CLEANING APPARATUS AND METHOD

[75] Inventor: Kunimi Ohhashi, Kanuma, Japan

[73] Assignee: Canon Kabushiki Kaisha, Tokyo, Japan

[21] Appl. No.: 741,273

[22] Filed: Jun. 4, 1985

[30] Foreign Application Priority Data

Jun. 7, 1984 [JP] Japan ............................ 59-117292

[51] Int. Cl.⁴ ............................................. B08B 3/10
[52] U.S. Cl. .................................... 134/56 R; 134/61; 134/63; 134/184
[58] Field of Search ............... 134/113, 184, 44, 56 R, 134/58 R, 61, 63; 366/116, 127; 68/355

[56] References Cited

U.S. PATENT DOCUMENTS

| | | | |
|---|---|---|---|
| 1,830,329 | 11/1931 | Nicolson | 366/127 |
| 2,842,143 | 7/1958 | Kearney | 134/89 X |
| 3,180,626 | 4/1965 | Mettlen | 134/184 X |
| 3,371,233 | 2/1968 | Cook | 68/355 X |
| 3,573,983 | 4/1971 | Antonevich | 134/184 X |
| 3,972,614 | 8/1976 | Johansen et al. | 366/116 X |
| 4,333,485 | 6/1982 | Karlsson et al. | 134/184 X |
| 4,409,999 | 10/1983 | Pedziwitar | 134/184 X |
| 4,556,467 | 12/1985 | Kuhn et al. | 134/184 X |

Primary Examiner—Harvey C. Hornsby
Assistant Examiner—Frankie L. Stinson
Attorney, Agent, or Firm—Fitzpatrick, Cella, Harper & Scinto

[57] ABSTRACT

An apparatus for cleaning a part such as optical glass by an ultrasonic wave in a plurality of steps has a plurality of preset operation modes for an ultrasonic wave output strength and an ultrasonic wave cleaning time in each step so that one of the operation modes is selected in accordance with a property of the part to clean it in an appropriate manner.

10 Claims, 5 Drawing Figures

ULTRASONIC WAVE CLEANING APPARATUS AND METHOD

BACKGROUND OF THE INVENTION

1. Field of the Invention

The present invention relates to apparatus and method for cleaning an article by an ultrasonic wave in a plurality of steps, in which a cleaning condition is selectable in accordance with a property of the article.

2. Description of the Prior Art

A multi-stage ultrasonic wave cleaning apparatus which sequentially immerses an article to be cleaned into cleaning baths containing different cleaning solutions to clean the article in a plurality of steps has been known.

For optical glass, it is necessary to change the ultrasonic wave output strength and the ultrasonic wave radiation time in accordance with various conditions such as the material of the glass, glass the surface structure and types of cleaning solutions. Thus, the ultrasonic wave output strength and the cleaning time for each bath must be changed each time the type of the article to be cleaned is changed.

SUMMARY OF THE INVENTION

It is an object of the present invention to provide a multi-stage ultrasonic cleaning apparatus which can readily change the cleaning conditions of baths in the respective steps in accordance with a type of article to be cleaned.

DETAILED DESCRIPTION OF THE PREFERRED EMBODIMENTS

In the following description, three articles to be cleaned, having low, intermediate and high resistances to an ultrasonic wave are handled in the apparatus of the present invention.

Figure 1:
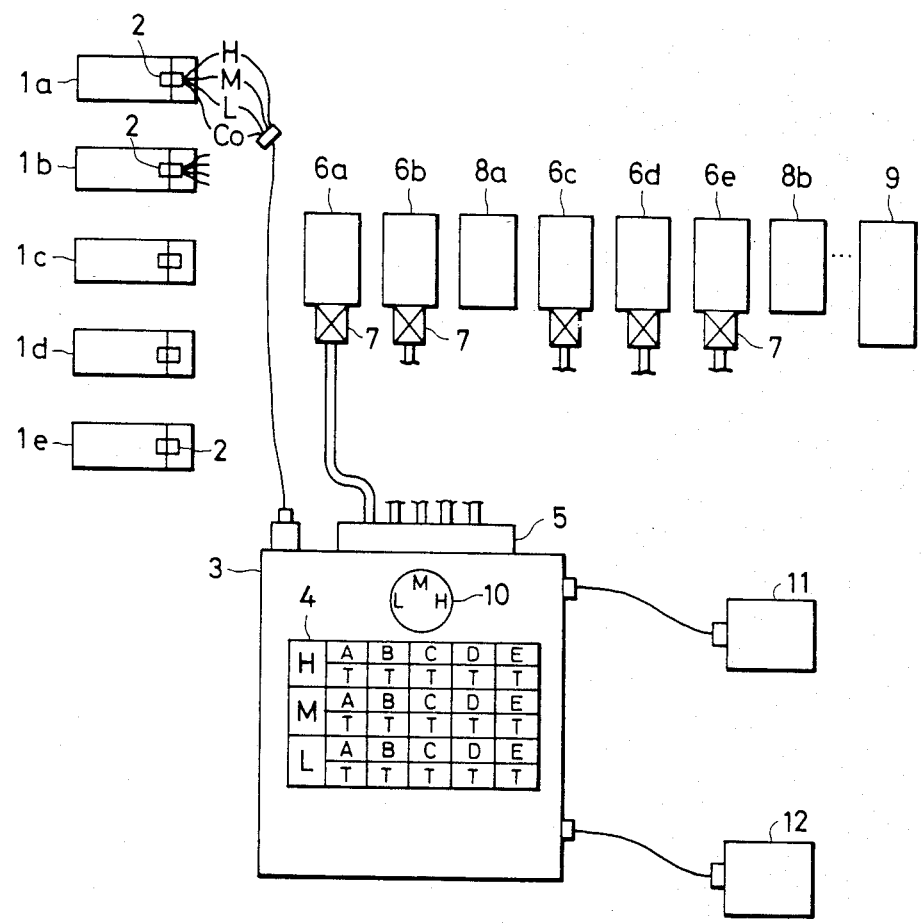
FIG. 1 is a block diagram of one embodiment of an ultrasonic cleaning apparatus of the present invention.

In FIG. 1, numerals 6a-6e denote ultrasonic cleaning baths in which cleaning liquids shown in the columns of the first to fifth steps in Table 1 are filled. The articles to be cleaned are sequentially immersed in the cleaning baths by an automatic conveyer and cleaned by the ultrasonic wave. Numeral 7 denotes an ultrasonic oscillator which oscillates in response to an applied ultrasonic wave oscillation wave. Numeral 3 denotes a control unit or controller which drives the ultrasonic wave oscillator 7 in one of three modes H, L and M. In the mode H, an article which has a high resistance to the ultrasonic wave is cleaned. When this mode is selected by a dial 10, the control unit 3 causes the ultrasonic wave oscillators 1a-1e to generate ultrasonic wave signals having outputs and duration shown in Table 1 and those signals are applied to the oscillators 7 of the ultrasonic cleaning baths 6a-6e. When the mode L or M is selected, the ultrasonic wave oscillation signals shown in the mode L or M in the Table 1 are supplied to the oscillators 7 of the ultrasonic wave cleaning baths 6a-6e. The drive times are shown in Table 1. They are set by an input keyboard 4 for the operation mode and the cleaning baths 6a-6e. The control unit 3 selects one of three oscillation signals supplied from the oscillators 1a-1e in accordance with the selected mode and supplies it to the oscillators 7 for a predetermined time period. Instead of switching being performed by the controller 3, the controller 3 may cause the ultrasonic wave generators 1a-1e to generate ultrasonic wave signals for the selected mode for the predetermined time period. In this case, the outputs may be adjusted by adjusting variable output transformers 2 of the ultrasonic wave oscillators 1a-1e. The selection of the mode L, M and H may be effected by the dial 10 or may be automatically effected as shown in FIG. 2.

Figure 2:
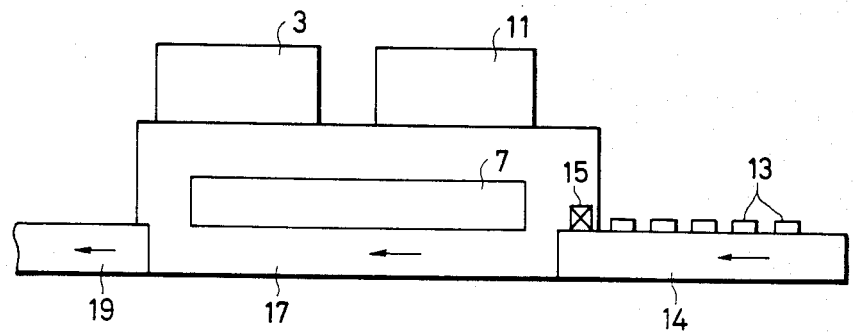
FIG. 2 illustrates conveyance of an article to be cleaned, and FIG. 3, consisting of FIGS. 3a-3c, illustrates discrimination of an ultrasonic wave output strength by a convey carrier.
Figure 3A:
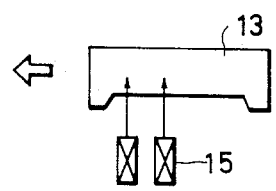
Figure 3B:
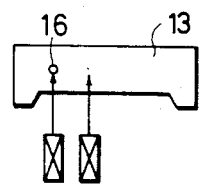
Figure 3C:
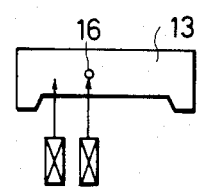

FIG. 2 illustrates conveyance of the articles to be cleaned. A convey carrier 13 which carries the articles to be cleaned is conveyed by an entry conveyer 14 and a reflection type photo-electric sensor 15 selects one of the ultrasonic wave output strengths H, M and L to be applied to the articles and the selected signal is applied to an output selector 11, shown also in FIG. 1. The carrier 13 has apertures selectively formed therein and, as shown in FIGS. 3A-3C, the strength of the ultrasonic wave output is selected by the position of the aperture and the presence or absence of the aperture. In FIG. 3A where no aperture is formed, the high strength H is selected. In FIG. 3B where the aperture 17 is formed on the left hand, the middle strength M is selected. In FIG. 3C where the aperture 16 is formed on the right hand, the low strength L is detected. By additionaly forming apertures 16 to the left and right, four levels of strength may be provided.

The controller 3 selects the outputs from the ultrasonic wave oscillators 1a-1e by the signal from the sensor 15 and distributes the selected signal to the ultrasonic oscillators 7 of the cleaning baths 6a-6e. On the other hand, the carrier 13 is conveyed by an onto-conveyer to a cleaning unit 17 which includes the ultrasonic wave cleaning bath 6, a solution cleaning bath 8 shown illustratively as including two baths 8a and 8b and a distillation drying bath 9 and the articles conveyed into the ultrasonic wave cleaning baths 6a-6e are cleaned by the ultrasonic wave at the preset output and duration. After the ultrasonic wave cleaning, solution cleaning and drying, the carrier 13 is conveyed out of an exit conveyer 19. When a computer is used to set the settings 12 shown in FIG. 1, the characteristics of the article to be cleaned are previously analyzed and the ultrasonic wave output strengths and the radiation times are stored for each of the cleaning baths 6a-6e.

As described hereinabove, the ultrasonic cleaning apparatus of the present invention can clean the articles to be cleaned having various materials and surface structures by the cleaning baths containing appropriate liquids therein with proper ultrasonic sound output strength and radiation time.

TABLE 1

| | Mode L | | Mode M | | Mode H | | |
|---|---|---|---|---|---|---|---|
| | Ultrasonic Wave Output (KW) | Cleaning Time (Sec) | Ultrasonic Wave Output (KW) | Cleaning Time (Sec) | Ultrasonic Wave Output (KW) | Cleaning Time (Sec) | Cleaning Solution |
| 1st Cleaning Step | 0.42 | 13 | 0.45 | 12 | 0.5 | 11 | Tetrachloroethylene ($Cl_2C=CCl_2$) |
| 2nd Cleaning Step | 0.32 | 12 | 0.4 | 11 | 0.48 | 10 | Water and Surface activating agent |
| Solution Cleaning Step | | | | | | | Water |
| 3rd Cleaning Step | 0.31 | 13 | 0.38 | 13 | 0.42 | 12 | Water and surface activating agent |
| 4th Cleaning Step | 0.38 | 12 | 0.43 | 12 | 0.48 | 12 | Pure Water |
| 5th Cleaning Step | 0.38 | 14 | 0.42 | 14 | 0.45 | 13 | alcohol |
| Solution Cleaning Step | | | | | | | alcohol |
| Distillation Drying Step | | | | | | | Trichlorotrifluoroethylene ($CCl_2F—CClF_2$) |

What is claimed is:

1. An ultrasonic wave cleaning apparatus for cleaning articles of different kinds, said apparatus comprising:
   carrying means for carrying articles to be cleaned, said carrying means having an identifying portion corresponding to the kind of article carried thereby to be cleaned;
   signal generating means for detecting said identifying portion and for generating a signal corresponding to the kind of article to be cleaned;
   a plurality of ultrasonic wave cleaning baths into which the article to be cleaned is sequentially immersed in a predetermined order;
   ultrasonic wave oscillators each mounted on a respective one of said ultrasonic wave cleaning baths;
   a first means for supplying an ultrasonic wave signal of a first strength to said oscillators for a first predetermined time period;
   a second means for supplying an ultrasonic wave signal of a different strength than said first strength to said oscillators for a second predetermined time period; and
   selection means for selecting one of said first and second supplying means on the basis of the signal from said signal generating means to apply an ultrasonic wave signal from the selected one of said supplying means to said plural oscillators.

2. An ultrasonic wave cleaning apparatus according to claim 1, wherein said identifying portion comprises at least one aperture.

3. An ultrasonic wave cleaning apparatus according to claim 2, wherein said signal generating means includes a photoelectric type detector for detecting said aperture.

4. An ultrasonic wave cleaning apparatus for cleaning articles of different kinds, said apparatus comprising:
   carrying means for carrying articles to be cleaned, said carrying means having an identifying portion corresponding to the kind of article carried thereby to be cleaned;
   signal generating means for detecting said identifying portion to generate a signal corresponding to the kind of article to be cleaned;
   a plurality of ultrasonic wave cleaning baths into which the article to be cleaned is sequentially immersed in a predetermined order;
   ultrasonic wave oscillators each mounted on a respective one of said ultrasonic wave cleaning baths;
   signal application means for applying an ultrasonic wave signal to said oscillators;
   setting means for setting a plurality of operation modes for the ultrasonic wave signal applied to said oscillators by said signal application means; and
   selection means for selecting one of the operation modes in accordance with the signal from said signal generating means to supply the ultrasonic wave signal for the selected operation mode to said oscillators.

5. An ultrasonic wave cleaning apparatus according to claim 4, wherein said identifying portion comprises at least one aperture.

6. An ultrasonic wave cleaning apparatus according to claim 4, wherein said signal generating means has a photoelectric type detector for detecting said aperture.

7. An ultrasonic wave cleaning apparatus according to claim 4, wherein each operatin mode is defined by at least the strength of the ultrasonic wave signal applied to said oscillators in that mode and the application period thereof.

8. An ultrasonic wave cleaning apparatus for cleaning articles of different kinds, said apparatus comprising:
   carrying means for carrying articles to be cleaned, said carrying means having an identifying portion corresponding to the kind of article carried thereby to be cleaned;
   signal generating means for detecting said identifying portion and for generating a signal corresponding to the kind of article to be cleaned; and
   a cleaning unit into which articles are carried by said carrying means, said cleaning unit comprising a plurality of ultrasonic wave cleaning baths into which the article is sequentially immersed in a predetermined order; and
   ultrasonic wave oscillators each mounted on a respective one of said ultrasonic wave cleaning baths,
   wherein said ultrasonic wave cleaning apparatus is operable in a plurality of operation modes which are each defined by conditions of application of an ultrasonic wave signal to said oscillators, one of said operation modes being selected in accordance with the signal from said signal generating means to supply the ultrasonic wave signal for the selected operation mode to said oscillators.

9. An ultrasonic wave cleaning apparatus according to claim 8, wherein said cleaning unit further comprises a solution cleaning bath and a distillation dry bath.

10. An ultrasonic wave cleaning apparatus according to claim 8, wherein the operation modes are each defined by, at least, the strength of the ultrasonic wave signal applied to said oscillators and the application time thereof.

* * * * *

UNITED STATES PATENT AND TRADEMARK OFFICE
CERTIFICATE OF CORRECTION

PATENT NO. : 4,672,984

DATED : June 16, 1987

INVENTOR(S) : KUNIMI OHHASHI

It is certified that error appears in the above-identified patent and that said Letters Patent is hereby corrected as shown below:

<u>COLUMN 4</u>

Line 43, "operatin" should read --operation--.
Line 56, "articles" should read --the articles--.

Signed and Sealed this

Sixth Day of October, 1987

*Attest:*

DONALD J. QUIGG

*Attesting Officer*  *Commissioner of Patents and Trademarks*